(12) United States Patent
Simon et al.

(10) Patent No.: US 8,302,084 B2
(45) Date of Patent: Oct. 30, 2012

(54) USING COMPILER COMMENTARY FOR CONFIGURING AN INTEGRATED DEVELOPMENT ENVIRONMENT

(75) Inventors: Alexander Simon, St. Petersburg (RU); Andrew Krasny, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1390 days.

(21) Appl. No.: 11/938,010

(22) Filed: Nov. 9, 2007

(65) Prior Publication Data

US 2009/0125873 A1    May 14, 2009

(51) Int. Cl.
*G06F 9/45* (2006.01)

(52) U.S. Cl. ........ 717/141; 717/143; 717/145; 717/154; 717/155

(58) Field of Classification Search .................... None
See application file for complete search history.

(56) References Cited

U.S. PATENT DOCUMENTS

| | | | | |
|---|---|---|---|---|
| 5,854,932 A | * | 12/1998 | Mariani et al. | 717/116 |
| 7,861,178 B2 | * | 12/2010 | Lui et al. | 715/762 |
| 7,966,170 B2 | * | 6/2011 | Dalal et al. | 704/2 |

* cited by examiner

*Primary Examiner* — Chuck Kendall
(74) *Attorney, Agent, or Firm* — Brooks Kushman P.C.

(57) ABSTRACT

A technique is disclosed for correcting inconsistent language model parameters associated with a compiled computer readable project. One or more compiled units are analyzed to identify compiler commentary therein. Based on the debugging information, it is determined whether inconsistent language model parameters exist. If so, a user is allowed to apply a correction strategy to correct the one or more inconsistent parameters.

20 Claims, 8 Drawing Sheets

```
include <stdio.h>                    ← 410 define __WINDOWS__                   ← 420 ifdef __WINDOWS__                    ← 430
include <windows.h>
#else
#include <unistd.h>
endif int main (void)
{
    printf("Hello, world!\n");
    return 0;
}
```

USING COMPILER COMMENTARY FOR CONFIGURING AN INTEGRATED DEVELOPMENT ENVIRONMENT

BACKGROUND OF THE INVENTION

1. Field of the Invention

The present invention relates to computer readable source projects, and more particularly to methods for determining a program structure associated with computer readable source projects.

2. Background Art

Computer readable source projects ("source projects") typically have a number of source code units and can have other supporting files, such as libraries, header files, and the like. Depending on the programming language and/or development environment, some source projects include a makefile that specifies project build instructions to an expert build utility, a so-called make. Alternatively, custom scripts may be deployed to build a source project.

Source projects are commonly edited via an integrated development environment ("IDE"). The IDE develops a model for a given source project by acclimating itself to the project's build conditions and other specifications. Certain IDEs include a make-based build utility and are thereby capable of building makefile-based source projects. However, these IDEs often do not know specific compilation details for various source files in the project. This is particularly true for very large projects which can contain thousand of files and tens of thousands of lines of code or more. Frequently, a developer will be confronted with a large software project that has already been developed. It is rare that a developer will develop such a large program from scratch. Even if they do, they frequently start off by modifying some large code. In such circumstances, a developer will bring the project into his or her environment of choice.

IDEs provide developers with the ability to understand and perhaps modify the code. Toward this goal, IDEs allow browsing through the large body of code at a source level. For example, an IDE may allow navigation from a statement to the location where the statement was first defined. IDEs also provide a feature called code assistance. Code assistance is a type of context help in which a developer is given information at each location in the code regarding functionality that is available and possibly the ability to automatically make changes to the code. IDEs may also provide the ability to distinguish active from inactive code (e.g., preprocessor directive that enable or disable a volume of code depending on the operating system). Finally, an effective IDE would show errors such as typographical errors or undefined symbols.

In order to function properly, IDEs need a good knowledge of the structure of the software project under consideration. Incomplete or inaccurate knowledge can result in an inconsistent information about the program structure. Consequently, a makefile-based source project may not be properly resolved (or parsed) by an internal IDE's parser. In this scenario, a user may be misinformed about the structure of the program. For example, hyperlinks, code completion, tool tips, source code highlighting, and etc. may not function properly. Furthermore, makefiles only track files necessary for the compilation of a source project. Therefore, files which may have been removed by a user after compilation (e.g. by removing an "include" preprocessor directive) may remain as part of the source project, resulting in an inconsistency between the actual project and the projected as presented to a user.

If a makefile is utilized, one way to provide accurate information regarding a program structure for use in an IDE is to manually analyze the makefile and specify missing information to the IDE (e.g. via a project properties option set). However, due to the complexity of makefiles, this method may be time consuming or not possible.

Accordingly, for at least these reasons, there is a need for robust methods of determining a program structure applicable to large complex programming projects.

SUMMARY OF THE INVENTION

The present invention solves one or more problems of the prior art by providing in at least one embodiment, a method determining the structure of a software project. The software project typically has one or more compilable units. The method of the present embodiment comprises a step of receiving program structure information from a user. The compilable units are then analyzed to identify compiler commentary contained therein. The compiler commentary is then used to determine (i.e., discover) the program structure. The program structure determined from the compiler commentary is reconciled with the information received from the user.

In another variation, an integrated development environment ("IDE") is provided for allowing a user to correct inconsistent language model parameters associated with a compiled computer readable project. The project has an associated makefile, one or more associated compiled units, and one or more associated source units. The IDE has a set of instructions in accordance with the first variation.

In yet another variation, a computer readable medium is provided having a set of instructions encoded thereto. The set of instructions includes instructions in accordance with the first variation.

BRIEF DESCRIPTION OF THE DRAWINGS

FIGS. 5A-4D provides screen shots illustrating a method for determining a program structure associated with a computer readable project in accordance with embodiments of the present invention.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

As used herein, the term "inconsistency," unless otherwise stated, refers to a deviation between an entity presented to a user and an entity expected by the user.

Figure 1:
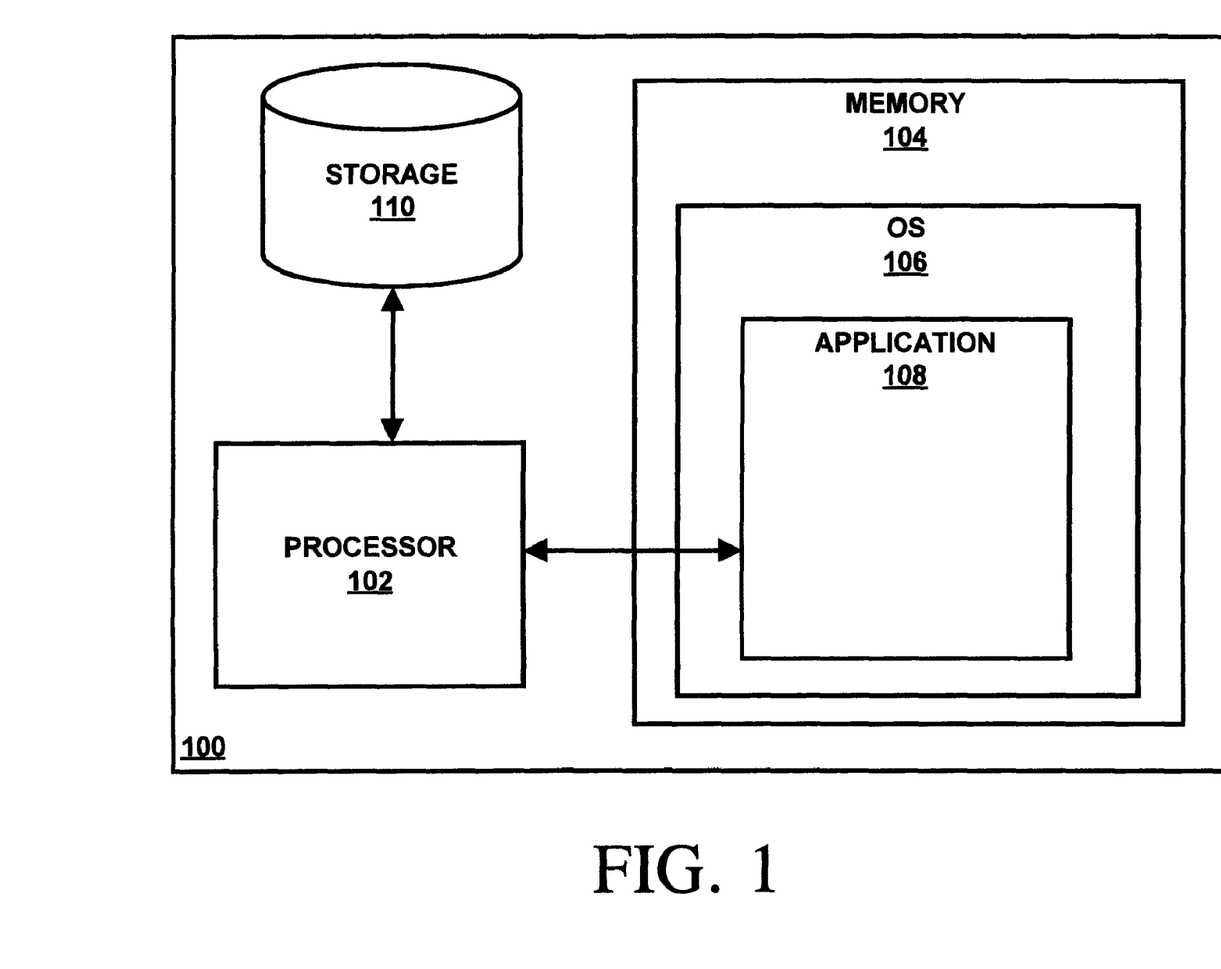
FIG. 1 shows an environment in which embodiments of the present invention may operate.

With reference to FIG. 1, a schematic illustration of a computer system that implements a method for determining the structure of a software project is provided. In this embodiment, computer 100 includes a processor 102 that is operable to execute instructions encoded in instruction memory 104. In a variation of the present embodiment, the instructions executed in performing the functions described herein comprise instructions stored within program code considered part of an operating system 106, instructions stored within program code considered part of an application 108, or instructions stored within a program code allocated between the operating system 106 and the application 108. In a particularly useful variation, application 108 is an integrated development environment (IDE). It will be understood by one skilled in the art that many other types of applications can also be used to execute the instructions described herein.

With continued reference to FIG. 1, memory 104 can be of any suitable memory type. Suitable examples of such memory types include, but are not limited to, random access memory ("RAM"), read only memory ("ROM"), or a combination of RAM and ROM. In further refinement of the present invention, computer 100 includes secondary storage device 110. Examples of suitable storage devices include, but are not limited to, disk drives, tape drives, or any other suitable secondary storage device. In one refinement, computer 100 may be any suitable computing device capable of executing the program code described herein. Examples of such computer devices include, but are not limited to, personal computers, server stations, laptops, and the like.

Figure 2:
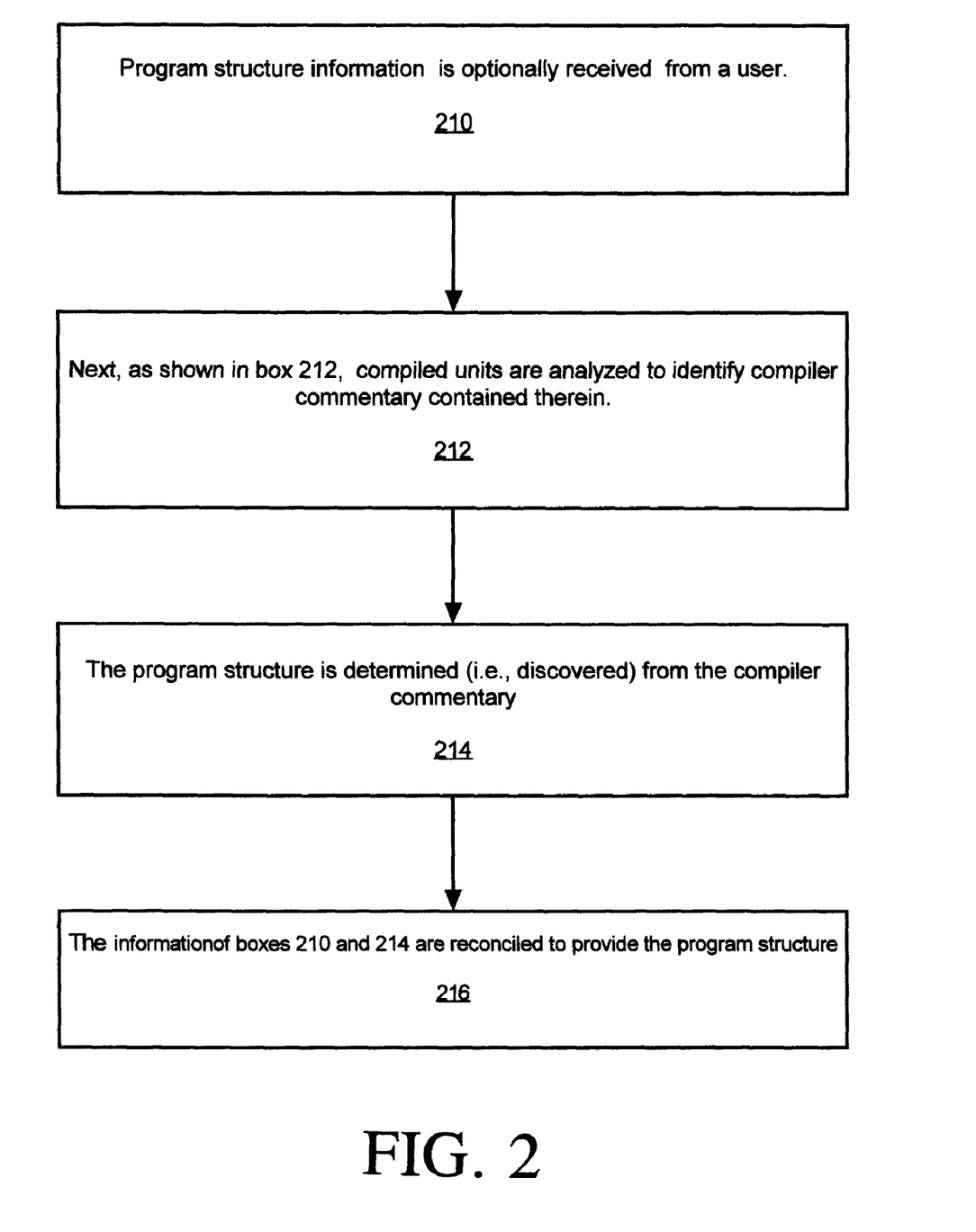
FIG. 2 shows a flow diagram illustration a method for determining a program structure for a computer readable project in accordance with embodiments of the present invention.

With reference to FIG. 2, a flowchart describing the method implemented by the system of FIG. 1 is provided. The method of this embodiment allows the determination of a structure of a software project having one or more compilable units. The program structure is described in terms of program structure parameters. The term "program structure parameters" as used herein refers to the information used by an IDE to provide navigational and syntax functionality. For example, such program structure parameters might include a symbol database and file database that is utilized by the IDE to keep track of the interrelationships between project components. Such structure parameters may in one instance be characterized by extraneous information relative to compilation of a source project. For example, a source project may have inconsistent structure parameters in the form of files not necessary for compilation. The structure parameters may instead be characterized by a source project having missing information. The source project may, for example, have inconsistent structure parameters in the form of missing information relating to user macros and include paths.

As set forth in box 210, program structure information is optionally received from a user. In this step a wizard or user input is used to obtain portions of the program structure to the extent available. The prior art methods of obtaining program structure may be used as part of this step. Moreover, in this context the user can be a person or a software application capable of determining program structure. Next, as shown in box 212, compiled units are analyzed to identify compiler commentary contained therein. The compiler commentary may be included in any of the compiled units 304 shown in FIG. 3. The program structure is determined (i.e., discovered) from the compiler commentary as shown in box 214. Finally, the information obtained in the steps of boxes 210 and 214 are reconciled to provide the program structure (box 216).

The reconciliation step set for in box 216, it typically accomplished by a redetermined reconciliation strategy. In one variation, the method of the present embodiment identifies one or more files unnecessary for compilation of the project. In this scenario, the user is typically informed that such files exist. In a refinement, the one or more files unnecessary for compilation include at least one of the source compilation units. Such compilation units include at least one component selected from the group consisting of source files and header files. In another variation, at least one inconsistent program structure parameter is defined by the project having missing project information. In this variation, the reconciliation strategy includes determining whether the project is missing project information and then restoring the missing project information. In a refinement of this variation, the missing project information includes the absence of at least one preprocessor directive of macro directives, conditional directives, and file inclusion directives. In still another variation, at least one inconsistent program structure parameter is defined by having at least one of the source compilation units with unidentified storage path locations. In this variation, the correction strategy includes programmatically identifying storage locations for the source compilation units with unidentified storage path locations.

Figure 3:
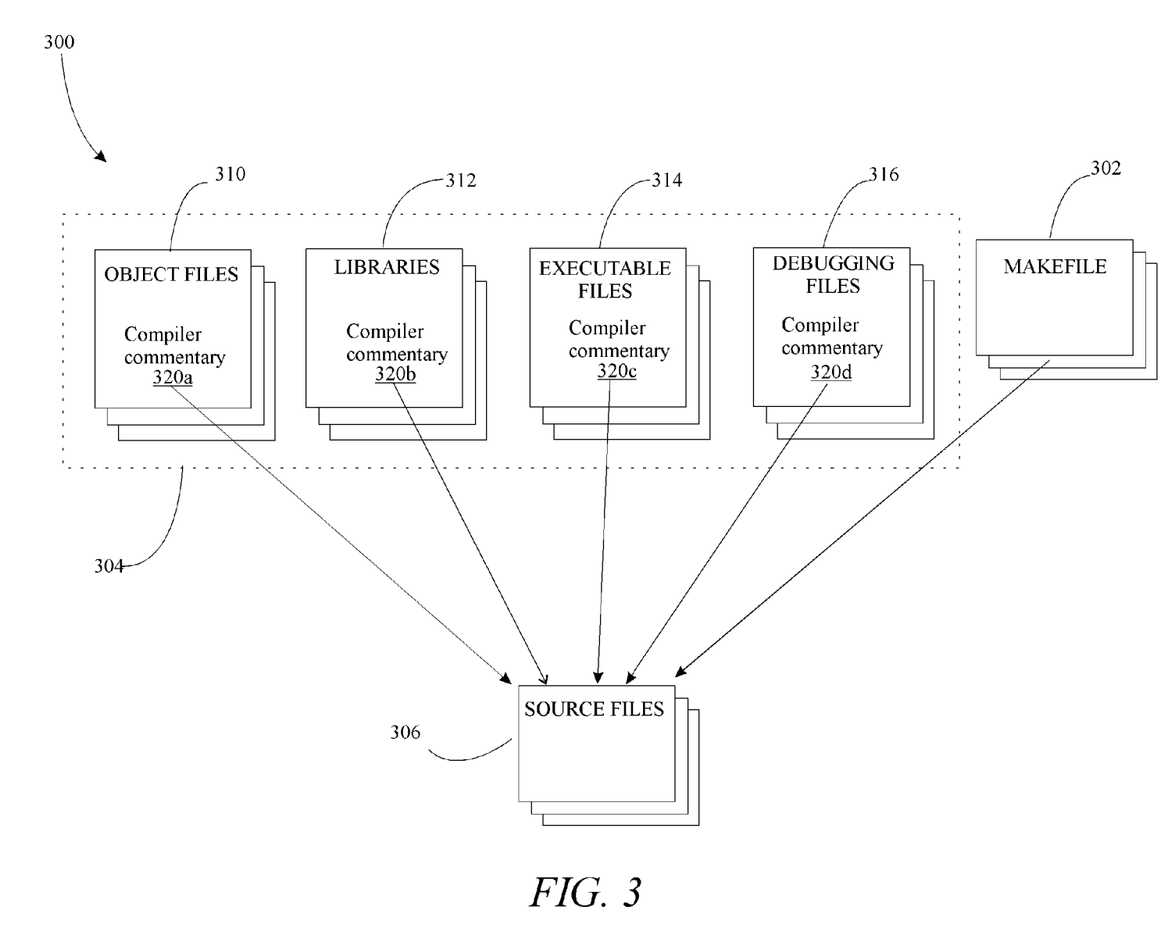
FIG. 3 shows a project application in accordance with embodiments of the present invention.

With reference to FIG. 3, a project application utilizing at least one embodiment of the present invention is provided. Project application 300 is sometimes referred to as "project," "project application," "application," "source application," "computer readable project," or "computer readable application." Application 300 includes makefile 302, one or more compiled units 304, and one or more source files 306. It should be appreciated that a custom script or other some technology may be used instead of a makefile. In a variation of the present embodiment, compiled units 304 include one or more of object files 310, libraries 312, executable files 314, and debugging files 316. Compiled units 304 (sometimes referred to herein as "compiled units") need not be compiled in the traditional sense. One skilled in the art will recognize a variety of alternative file types in place of the previously described compiled units 304. For example, compiled units 304 can be files associated with an interpreted language, such as so-called byte code files, examples of which include various implementations of Java, C#, C ++.Net, and Visual Basic.Net. In another refinement, the compiled units are any file or data type, compiled or non-compiled, that provides compiler commentary relating to compilation of project application 300.

As shown in FIG. 3, each compiled unit 304 has associated compiler commentary, which is generally referred to by 320. The compiler commentary 320 includes any information generally relating to the identification of information associated with the compiled project 300. At least some of compiler commentary 320 including information relating to one or more of the source files 306. In one or more refinements, the compiler commentary includes build-time information relating to source files, preprocessor directives, headers, and the like. In other refinements, the compiler commentary 320 is associated with project variables, types, constants, subroutines, and the like, to translate between machine-level storage and source language constructs. In one particularly useful variation, compiler commentary 320 includes debugger information such as that information provided by many compilers. Currently, such information conforms to the DWARF standard. The present invention embraces the use of debugger information as well as any similar commentary describing a program structure.

Object file 310 is any file that exhibits the representation of code that a given compiler or assembler generates by processing a source code file. Libraries 312 are entities which link to external functions and variables that result at compile time. Libraries 312 can be either static or dynamic in nature as dictated by the particular configuration of project 300. Executable files 314 include any program files that run alone or in conjunction with other files and further operate in a variety of operating system environments or embedded system environments. For example, the Windows operating system environment commonly refers to executable files by the extension ".exe". Debugging files 316 include any files for storing information about a compiled program for use by high-level debuggers. Such debugging format files conventionally store enough information to allow for debugging at the source code level. As mentioned above, program project 300 includes a makefile 302 or other analogous file having information relating to compilation of the project 300. Source files 306 may have inconsistent program structure parameters parameters associated therewith.

In a refinement of the present invention, the inconsistent language model parameters are characterized by extraneous information relative to compilation of a source project. For example, a source project could have inconsistent language model parameters in the form of source files not necessary for compilation. In another refinement, the inconsistent language model parameters are instead characterized by a source project having missing information. It will be apparent from the following disclosure that the techniques disclosed hereinforth for correcting inconsistent language model parameters do not generally rely on the information provided by the makefile 302 to do so.

In one refinement of the invention, the source files 306 include compilation information for purposes such as source file inclusion, macro definition, and conditional inclusion.

Figure 4:
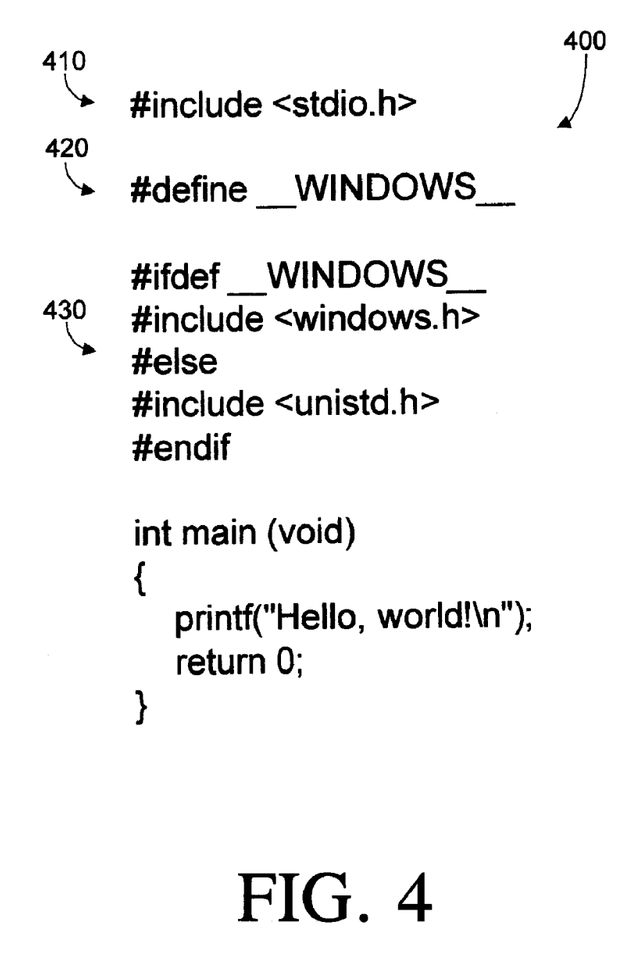
FIG. 4 shows a source compilation unit having several types of preprocessor directives.

With reference to FIG. 4, example source code associated with the C++ programming language ("C++") having several forms of compilation information is provided. Exemplary code 400 includes "preprocessor directives" or "directives." The preprocessor directive "#include," followed by an absolute or relative file path, indicates the inclusion of a project source unit, such as another source file or a header file. For example, the directive "#include <stdio.h>," as referred to by element 410, refers to the inclusion of the header file "stdio.h" as part of the project. Macro definitions are employed in C++ through the preprocessor directive "#define." Referring to element 420, the expression "#define_WINDOWS_" defines a global reference called "_WINDOWS_." Conditional inclusion is employed using preprocessor directives such as "#ifdef," "#else," and "#endif." Code portion 430 checks for the global reference "_WINDOWS_", and includes "windows.h" in the project build if it exists. Otherwise, "unistd.h" is instead included in the project build. The description of these preprocessor directives is not meant to exhaustively enumerate the various source file compilation information types. One skilled in the art will recognize that different types of compilation information may be used from a variety of other programming languages.

With reference to FIGS. 5A-5D, illustrations of windows depicting the method of the present embodiment are provided. As set forth above, the present embodiment utilizes an integrated development environment that advantageously presents collectively illustrate a method via an integrated development environment (IDE) for correcting inconsistent language model parameters associated with a computer readable source project. The IDE shown in FIG. 5 is a variation of NETBEANS™, commercially available from Sun Microsystems, Inc. One skilled in the art will recognize that a variety of alternative IDEs can be used in place of NETBEANS™. Advantageously, the IDE of the present embodiment allows navigation through the source code in a software project. In providing such code browsing capability, the present embodiment provides additional functionality such as code assistance, code completion, the ability to distinguish active from inactive code, and error detection and correction.

Figure 5A:
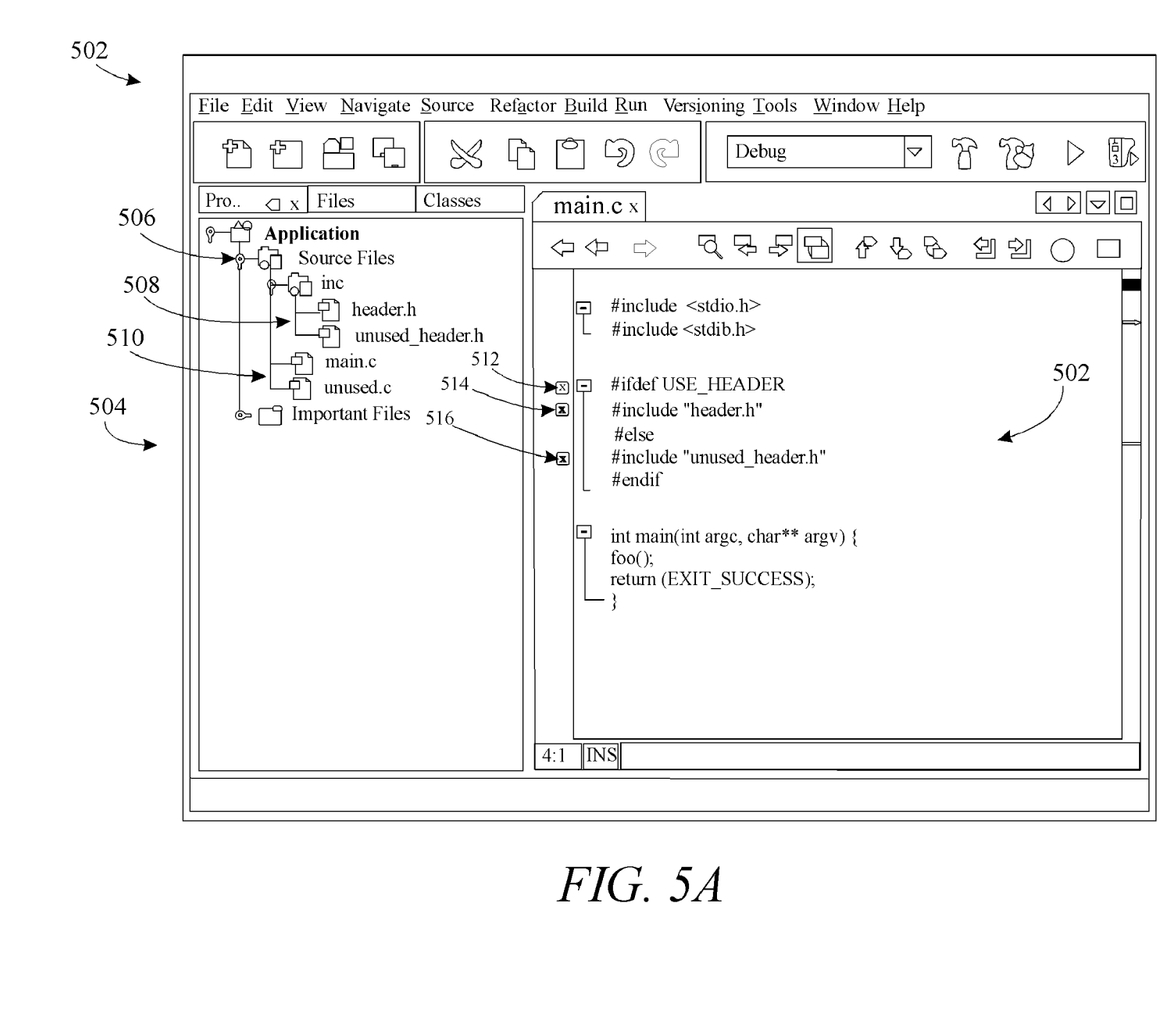

Referring to FIG. 5A, an IDE 500 is shown with a source project opened. The left portion 504 of the IDE 500 shows files associated with the project, while the right portion 502 shows a source compilation unit, specifically "main.c". As shown by element 508, the source project in IDE 500 includes two header files, "header.h" and "unused_header.h". Each header file 500 is located in a project subdirectory "inc" 506. The source project also includes two source compilation unit files 510, "main.c" and "unused.c". Of course, other source and header files can be included in the source project. Although not shown, it is assumed that the source project includes one or more object files, libraries, executable files, debugging files, and other compiled files. The source project also includes a makefile as set forth above. Again, one skilled in the art will readily recognize the extension of the present invention to situations where makefiles are not used.

With regard to the project shown in FIG. 5A, the files "header.h" and "main.c" are files necessary for compilation of the project, while the files "unused_header.h" and "unused.c" are files unnecessary for compilation of the project. Elements 512, 514, and 516 indicate inconsistencies in "main.c." Inconsistency 512 conveys that the IDE does not recognize the preprocessor macro "USE_HEADER" as a valid macro. Inconsistencies 514 and 516 convey that the IDE does not recognize the files "header.h" and "unused_header.h" as valid files. In a refinement of the invention, each inconsistency 512-516 is caused by one or more incorrect program structure parameters. For example, with respect to inconsistency 512, the IDE 500 does not have sufficient information to recognize the location of the preprocessor macro "USE_HEADER."

Figure 5B:
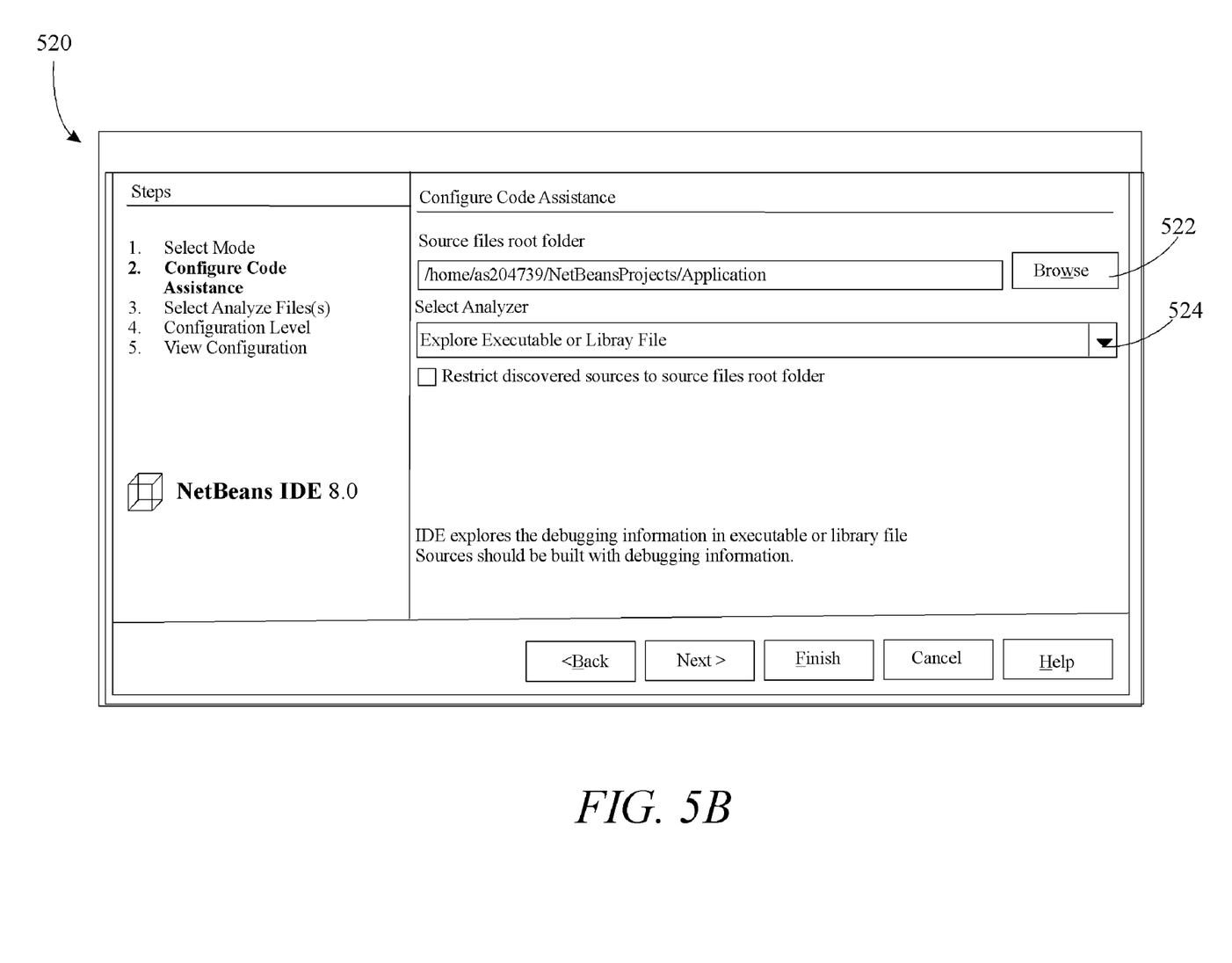
Figure 5C:
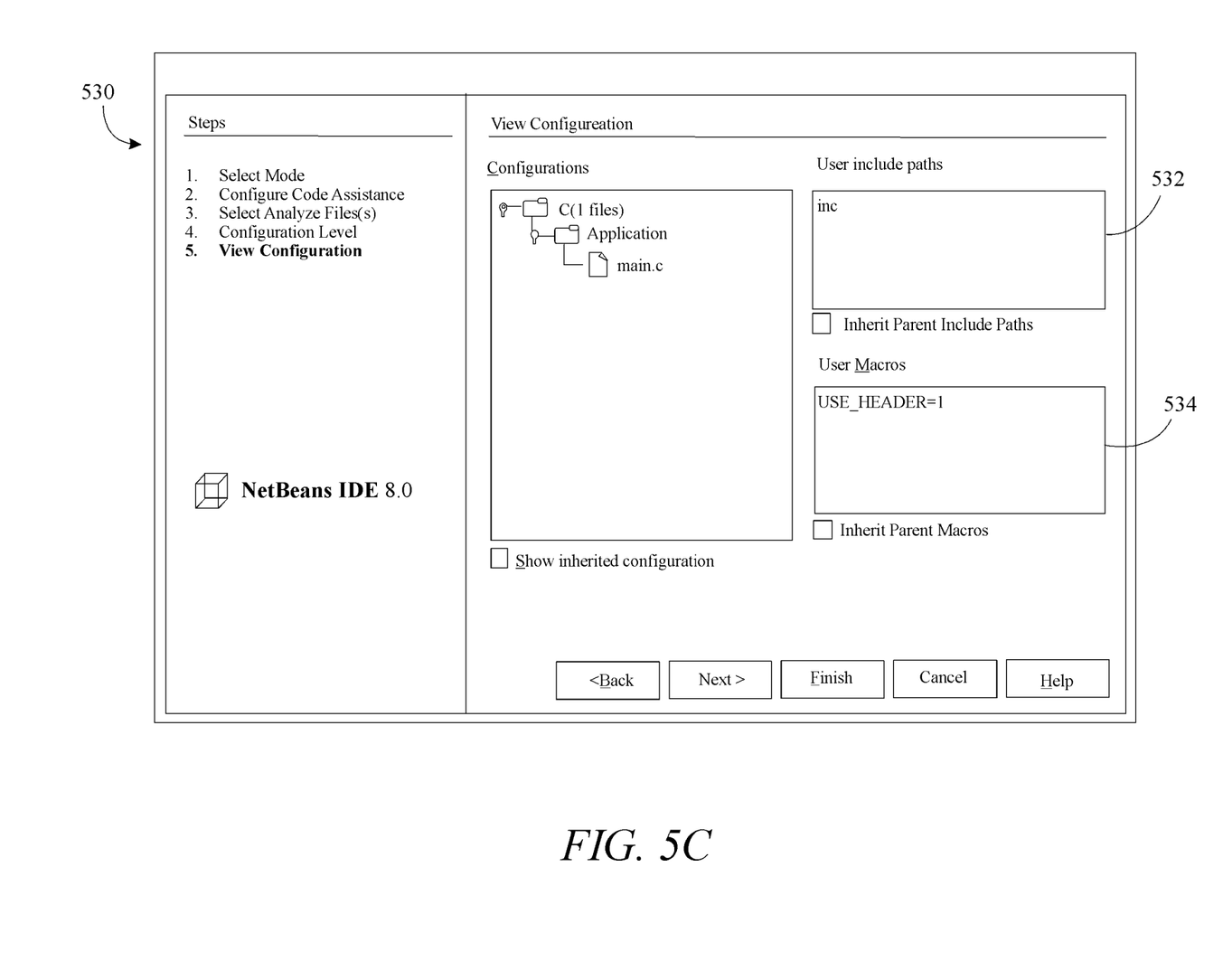

FIGS. 5B-5C provide discovery wizard 520 for correcting inconsistent language model parameters in a source project. The discovery wizard 520 is exemplarily shown to provide program structure parameter analysis to the source project shown in IDE 500 of FIG. 5A. Referring to FIG. 5B, the discovery wizard 520 analyzes compiled files to identify compiler commentary (e.g., debugging information) and, based on the compiler commentary, determine if one or more inconsistent language model parameters exists. This step is designated as "Configure Code Assistance." As shown by item 522, the main project application directory is chosen for analysis. At item 524, object files, debugging files, executable, and/or library files are selected by a user in order to identify compiler commentary therein. For each object identified at item 524, compiler commentary will be sought. Such commentary of course can be debugging information (e.g., DWARF). For each item having such commentary, compilation units are sought and processed if found.

The compilation units contain various information that is relevant to the program structure discovery process, such information includes, but is not limited to, the language of the source code, a list of directories (i.e., full path to folders where included files are located), a list of included files, a table of directories and associated included files, and a table of macros (compiler's predefined macros, user defined macros, macros defined in source code). Each of this information if present is used to assist in the identification of the program structure parameters. The method of the present invention attempts to resolve the situation when an include directive contains path information.

FIG. 5C shows the discovery wizard 520 after completing analysis of the source project. In general, the result of the analysis of a compilation unit includes the language of the source code, name of source code files, a list of user defined macros, a list of user include paths, a list of included files, The result of analyzing all compilation units is a list of all compiled sources with each item having an associated name, language, user macros, user include paths. Results 530 also include a list of all included files (files from system include paths are ignored). With respect to the present example, list box 532 include paths, or previously unidentified storage locations, derived from the analysis. List box 534 depicts macros identified in the analysis which were previously unknown to the IDE due to inconsistencies. Also set forth in discovery wizard 520, the discovery wizard includes a step designated as "Configuration Level." During this step, a user selects consolidation level for the resulting analysis information. The discovery wizard consolidates information at the project or folder level. If user selects file level, then consolidation is not performed.

Still referring to FIG. 5C, the last step of discovery wizard 520 is designated as "View Configuration." At this stage, the user views discovered information regarding the project structure. Such information grouped by language as set forth above. For each discovered language, information is grouped by physical file structure. For each object in the tree, the user can observe user defined macros and user include paths. Project level information is a top level tree nodes that corresponds to the source code language. Folder level information is a folder that contains at least one source file. File level information is typically a listing of source files. It should be appreciated that as a project structure is changed, items may be added and unused items marked as unused. In case of file configuration level, discovery wizard 520 sets user defined macros and user include paths for each file while clearing folder and project level configurations. At the folder configuration level, discovery wizard 520 sets consolidated user defined macros and user include paths for each folder while clearing file and project level configurations. In case of project configuration level, discovery wizard sets consolidated user defined macros and user include paths for the project while clearing file and folder level configurations.

Figure 5D:
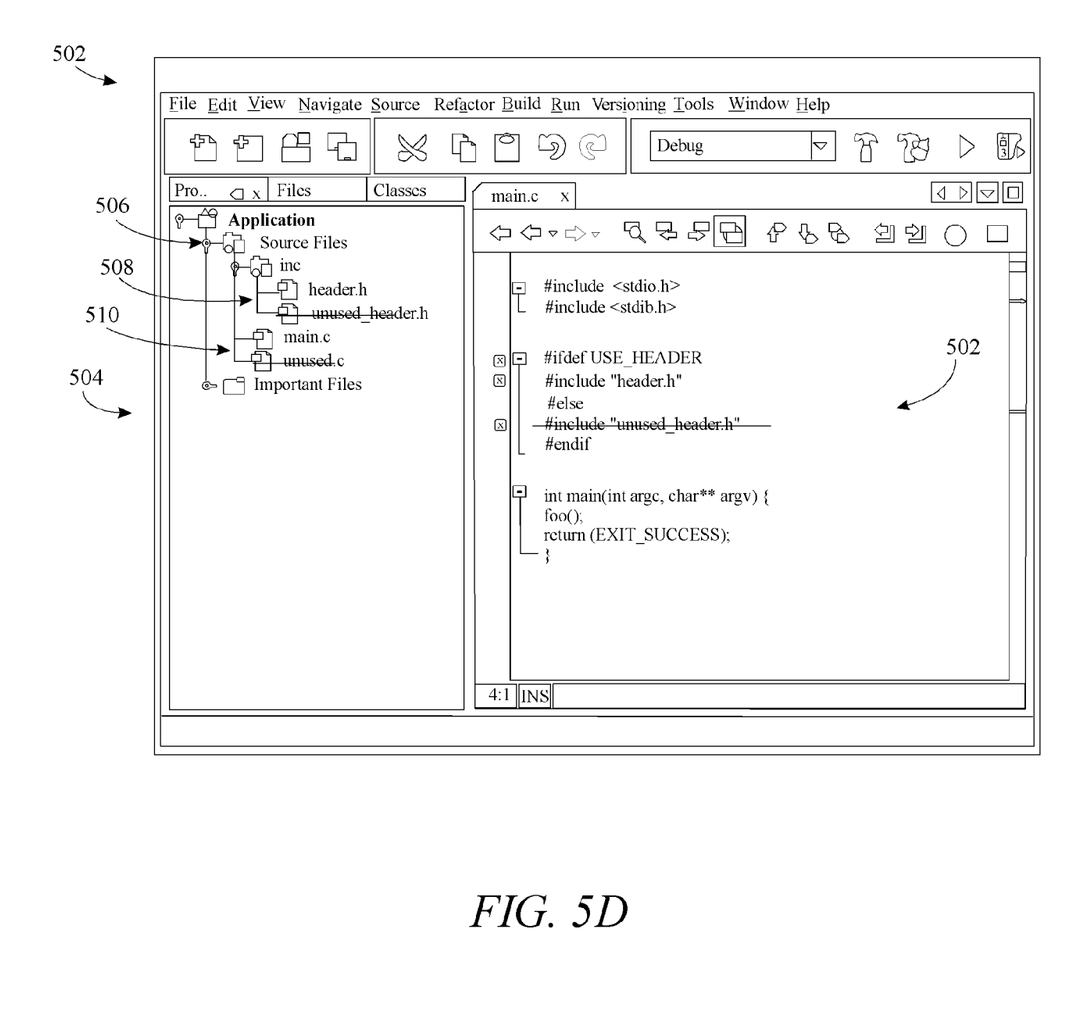

FIG. 5D shows the IDE 500, with the opened source project shown in FIG. 5A, upon completion of the language model analysis. Note that inconsistencies 512-516 in FIG. 5A are now resolved in FIG. 5D, due to the identification of the include path "inc" and the macro "USE_HEADER." Furthermore, the analysis revealed files unnecessary for compilation. Accordingly, "unused_header.h" and "unused.c" are graphically shown in a "strike-out" font style to indicate to the user that these two files are unnecessary for compilation. In this manner, files unnecessary for compilation are indicated to the user. For diagrammatic simplicity, each inconsistent language model parameter is shown to be corrected via the discovery wizard 520 in FIGS. 5B-5C. One skilled in the art will recognize that, in implementation, a user may choose one or more inconsistent language model parameters to correct.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining a structure of a computer program project, the project having one or more compilable units, the method comprising:
   a) receiving program structure information from a user, the program structure information being described by program structure parameters that are used to provide navigational and syntax functionality, the program structures parameters including a symbol database and file database that keeps track of the interrelationships between project components;
   b) analyzing at least one of the compilable units to identify compiler commentary contained therein;
   c) discovering information about the program structure from the compiler commentary; and
   d) reconciling the information obtained from steps a) and c).

2. The method of claim 1 wherein step d) is accomplish by a reconciliation strategy.

3. The method of claim 1 wherein the compiler commentary comprises debugger information.

4. The method of claim 1 wherein step d) comprises identifying one or more files unnecessary for compilation of the project.

5. The method of claim 3 further comprises indicating to the user files unnecessary for compilation.

6. The method of claim 5 wherein the one or more files unnecessary for compilation include at least one of the source compilation units.

7. The method of claim 5 wherein the source compilation units include at least one component selected from the group consisting of source files and header files.

8. The method of claim 2 wherein at least one inconsistent program structure parameter is defined by the project having missing project information, and the reconciliation strategy includes determining whether the project is missing project information.

9. The method of claim 8 wherein the reconciliation strategy includes programmatically restoring the missing project information.

10. The method of claim 8 wherein the missing project information includes the absence of at least one preprocessor directive of macro directives, conditional directives, and file inclusion directives.

11. The method of claim 1 wherein at least one inconsistent program structure parameter is defined by having at least one of the source compilation units with unidentified storage path locations.

12. The method of claim 11 wherein the correction strategy includes programmatically identifying storage locations for the source compilation units with unidentified storage path locations.

13. The method of claim 1 wherein the compiled units include at least one of object files, library files, and executable files.

14. An integrated development environment (IDE) providing code browsing functionality to a user, the IDE determining a program structure by the method comprising:
 a) receiving program structure information from a user, the program structure information being described by program structure parameters that are used to provide navigational and syntax functionality, the program structure parameters including a symbol database and file database that keeps track of the interrelationships between project components;
 b) analyzing at least one of the compilable units to identify compiler commentary contained therein;
 c) discovering information about the program structure from the compiler commentary; and
 d) reconciling the information obtained from steps a) and c) with a reconciliation strategy.

15. The IDE of claim 14 wherein at least one program structure parameter is defined by the project having one or more files unnecessary for compilation of the project.

16. The IDE of claim 14 wherein at least one inconsistent language program structure parameter is defined by the project having missing project information, and the reconciliation strategy includes determining whether the project is missing project information.

17. The IDE of claim 16 wherein the reconciliation strategy includes programmatically restoring the missing project information.

18. The IDE of claim 15 wherein at least one inconsistent program structure parameter is defined by having at least one of the source compilation units with unidentified storage locations.

19. The IDE of claim 18 wherein the reconciliation strategy includes programmatically identifying storage locations for the source compilation units with unidentified storage locations.

20. A computer readable medium comprising a set of instructions encoding a method for determining a program project structure, the project having one or more compilable units, the method comprising:
 a) receiving program structure information from a user, the program structure information being described by program structure parameters that are used to provide navigational and syntax functionality, the program structure parameters including a symbol database and file database that keeps track of the interrelationships between project components;
 b) analyzing at least one of the compilable units to identify compiler commentary contained therein;
 c) discovering information about the program structure from the compiler commentary; and
 d) reconciling the information obtained between steps a) and c).

* * * * *

UNITED STATES PATENT AND TRADEMARK OFFICE
CERTIFICATE OF CORRECTION

| | |
|---|---|
| PATENT NO. | : 8,302,084 B2 |
| APPLICATION NO. | : 11/938010 |
| DATED | : October 30, 2012 |
| INVENTOR(S) | : Alexander Simon |

It is certified that error appears in the above-identified patent and that said Letters Patent is hereby corrected as shown below:

Column 8, Line 27, Claim 1:

After "the program"
Delete "structures" and
Insert -- structure --

Signed and Sealed this
Second Day of April, 2013

Teresa Stanek Rea
*Acting Director of the United States Patent and Trademark Office*